US011252590B2

(12) United States Patent
Sundararajan et al.

(10) Patent No.: US 11,252,590 B2
(45) Date of Patent: Feb. 15, 2022

(54) LICENSE BASED TRAFFIC MANAGEMENT IN HYBRID NETWORKS

(71) Applicant: Cisco Technology, Inc., San Jose, CA (US)

(72) Inventors: Balaji Sundararajan, Fremont, CA (US); Sanjay Kumar Hooda, Pleasanton, CA (US); Venkatesh Ramachandra Gota, Bangalore (IN); Chandramouli Balasubramanian, Mountain View, CA (US); Anand Oswal, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 34 days.

(21) Appl. No.: 16/672,048

(22) Filed: Nov. 1, 2019

(65) Prior Publication Data
US 2021/0136607 A1  May 6, 2021

(51) Int. Cl.
| | | |
|---|---|---|
| *H04W 24/08* | (2009.01) | |
| *H04W 28/02* | (2009.01) | |
| *H04W 36/22* | (2009.01) | |
| *H04W 28/24* | (2009.01) | |
| *H04W 48/06* | (2009.01) | |

(52) U.S. Cl.
CPC ....... *H04W 24/08* (2013.01); *H04W 28/0221* (2013.01); *H04W 28/0284* (2013.01); *H04W 28/0289* (2013.01); *H04W 28/24* (2013.01); *H04W 36/22* (2013.01); *H04W 48/06* (2013.01)

(58) Field of Classification Search
CPC .. H04L 43/16; H04W 24/08; H04W 28/0221; H04W 28/0284; H04W 28/0289; H04W 28/24; H04W 36/22; H04W 48/06
See application file for complete search history.

(56) References Cited

U.S. PATENT DOCUMENTS

| | | | |
|---|---|---|---|
| 9,882,797 B2 | 1/2018 | Amokrane et al. | |
| 10,116,521 B2 | 10/2018 | Kokkula et al. | |
| 10,237,773 B2 | 3/2019 | Raleigh et al. | |
| 10,257,082 B2 | 4/2019 | Hughes | |
| 2017/0310611 A1 | 10/2017 | Kumar et al. | |
| 2020/0196191 A1* | 6/2020 | Deparisse | H04L 43/16 |

* cited by examiner

*Primary Examiner* — Khoa Huynh
(74) *Attorney, Agent, or Firm* — Polsinelli PC (57) ABSTRACT

Systems and methods for managing traffic in a hybrid environment include monitoring traffic load of a local network to determine whether the traffic load exceeds or is likely to exceed a maximum traffic load, where the maximum traffic load is a traffic load for which a service can be provided by the local network, based on a license. An excess traffic load is determined if the traffic load exceeds or is likely to exceed the maximum traffic load. One or more external networks which have a capacity to provide the service to the excess traffic load are determined, to which the excess traffic load is migrated. The local network includes one or more service instances for providing the service for up to the maximum traffic load, and the service to the excess traffic load is provided by one or more additional service instances in the one or more external networks.

20 Claims, 6 Drawing Sheets

LICENSE BASED TRAFFIC MANAGEMENT IN HYBRID NETWORKS

TECHNICAL FIELD

The present technology pertains to cloud computing, and more specifically to license based traffic management in hybrid cloud computing environments including a mix of on-premises and cloud computing services.

BACKGROUND

The ubiquity of Internet-enabled devices has created an enormous demand for Internet services and content. There are associated challenges for service and content providers who often struggle to service a high volume of user requests without falling short of user performance expectations. For example, cloud providers typically need large and complex datacenters to keep up with network and content demands from users. These datacenters are generally equipped with server farms configured to host specific services, and include numerous switches and routers programmed to route datacenter traffic and enforce a large amount of security policies. In many instances, a specific datacenter is expected to handle millions of traffic flows and enforce numerous security requirements.

Private networks owned by entities such as enterprises or organizations similarly have increasing demands for computing resources and performance. To satisfy such increasing demands, such entities often purchase compute resources and services from cloud providers. For example, such entities can create a virtual private cloud or network on a public cloud and connect the virtual private cloud or network to their private or on-premises network in order to grow their available compute resources and capabilities. In this way, the entities can interconnect their private or on-premises datacenter with a remote datacenter hosted on a public cloud, and thereby extend their private network.

In some examples, the cloud computing resources may be made available in a subscription basis with associated licenses to the private or on-premises environments. Since a customer may be charged on the basis of the subscription or amount of cloud computing resources utilized, in hybrid environments which include a mix of on-premises and cloud computing services, the customer may find it desirable to maximize the utilization of the on-premises services while minimizing the reliance on the cloud computing resources. However, the actual split between the utilization of the on-premises and cloud computing services may depend upon associated licenses, which can deviate from the customer's desired split. For example, the licenses that the customer has subscribed to can impose restrictions on the resource usage for the on-premises services as the cloud service provider may wish to maximize the customer's reliance on the cloud computing services. Thus, the customer may experience unusual spikes in traffic or demand on the on-premises resources (e.g., retailers during the holiday season may experience a seasonal spike in their on-premises network usage). However, the customer may not wish to permanently subscribe to a higher level of license designed to handle this occasional spike. However, the ability to offload such spikes to the cloud computing services can also be restricted if the subscription is tailored for typical traffic for cost saving purposes. Therefore, there is a need for better systems and methods to manage traffic flow and computing resources in the hybrid computing environments having a mix of on-premises and license-based cloud computing resources.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for migrating traffic from a local network to one or more external networks based on a license available to the local network for providing a service to traffic load of the local network. For example, the license can determine the maximum traffic load for the service can be provided, e.g., by one or more service instances of the local network. When the traffic load exceeds or is likely to exceed the maximum traffic load an excess traffic load is identified for offloading from the local network such that the service can continue to be provided to the excess traffic load. In some examples, one or more external networks which have a capacity to provide the service to the excess traffic load are identified. These external networks can include one or more cloud networks or other outside networks which can provide the service for the excess traffic load. For example, one or more additional service instances may need to be provided in the external networks to provide the service to the excess traffic load. These one or more additional service instances may already be present or may be instantiated in respective external networks. A multi-site controller with knowledge of which external networks can support the one or more additional service instances, for example, can route the excess traffic to one or more external networks. In some examples, an additional license may be associated with the one or more additional service instances, which can be used to determine an updated license for the local network.

In some examples, at least a portion of the excess traffic load can be migrated back to the local network from the one or more external networks when the traffic load falls below the maximum traffic load. In some examples, the service can include one or more of a firewall, content delivery network (CDN), intrusion prevention system (IPS), or video-optimization. In some examples, the traffic load can include one or more of a throughput, traffic flow, number of concurrent connections, processing resource utilization, or memory resource utilization.

Accordingly in some examples, a method is provided, where the method comprises monitoring traffic load of a local network to determine whether the traffic load exceeds or is likely to exceed a maximum traffic load, wherein the maximum traffic load is a traffic load for which a service can be provided by the local network, based on a license for the service available to the local network; determining an excess traffic load if the traffic load exceeds or is likely to exceed the maximum traffic load; determining one or more external networks which have a capacity to provide the service to the excess traffic load; and migrating the excess traffic load to the one or more external networks.

In some examples, a system is provided, the system, comprising one or more processors; and a non-transitory computer-readable storage medium containing instructions, which, when executed on the one or more processors, cause the one or more processors to perform operations including: monitoring traffic load of a local network to determine whether the traffic load exceeds or is likely to exceed a maximum traffic load, wherein the maximum traffic load is a traffic load for which a service can be provided by the local network, based on a license for the service available to the local network; determining an excess traffic load if the traffic load exceeds or is likely to exceed the maximum traffic load; determining one or more external networks which have a capacity to provide the service to the excess traffic load; and migrating the excess traffic load to the one or more external networks.

In some examples, a non-transitory machine-readable storage medium is provided, including instructions configured to cause a data processing apparatus to perform operations including: monitoring traffic load of a local network to determine whether the traffic load exceeds or is likely to exceed a maximum traffic load, wherein the maximum traffic load is a traffic load for which a service can be provided by the local network, based on a license for the service available to the local network; determining an excess traffic load if the traffic load exceeds or is likely to exceed the maximum traffic load; determining one or more external networks which have a capacity to provide the service to the excess traffic load; and migrating the excess traffic load to the one or more external networks.

In some examples, the local network includes one or more service instances for providing the service for up to the maximum traffic load, and wherein the service to the excess traffic load is provided by one or more additional service instances.

In some examples, the one or more additional service instances are available or instantiated in the one or more external networks.

Some examples further comprise associating an additional license with the one or more additional service instances.

Some examples further comprise determining an updated license for the local network based on the additional license.

Some examples further comprise migrating at least a portion of the excess traffic load back to the local network from the one or more external networks when the traffic load falls below the maximum traffic load.

In some examples, the service comprises one or more of a firewall, content delivery network (CDN), intrusion prevention system (IPS), or video-optimization.

In some examples, the traffic load comprises one or more of a throughput, traffic flow, number of concurrent connections, processing resource utilization, or memory resource utilization.

In some examples, the one or more external networks comprise one or more cloud networks.

Description of Example Embodiments

The disclosed technologies address the need in the art for automatic, elastic, and seamless traffic migration in hybrid networks, while maximizing license usage and minimizing expenses. For example, the approaches herein can integrate policies across disparate cloud or datacenter environments in a multi-cloud fabric and support elastic steering of traffic across the disparate cloud or datacenter environments based on predicted and/or current loads in a manner that licenses, throughputs, connections, and/or other subscriptions by local networks are not exceeded.

Figure 1A:
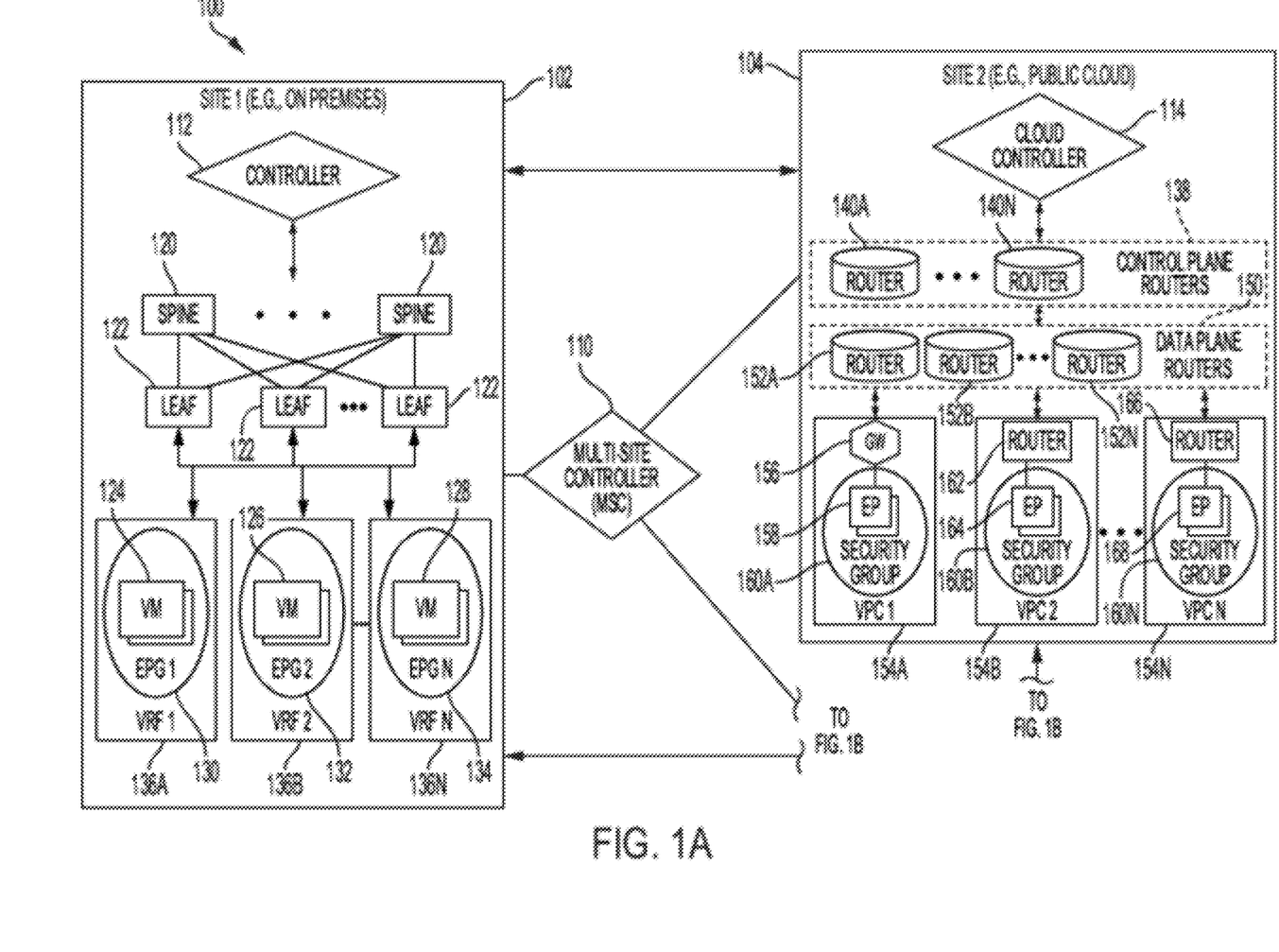
FIGS. 1A and 1B illustrate an example architecture for policy scaling and integration in a multi-cloud fabric including an on-premises site and public clouds.
Figure 1B:
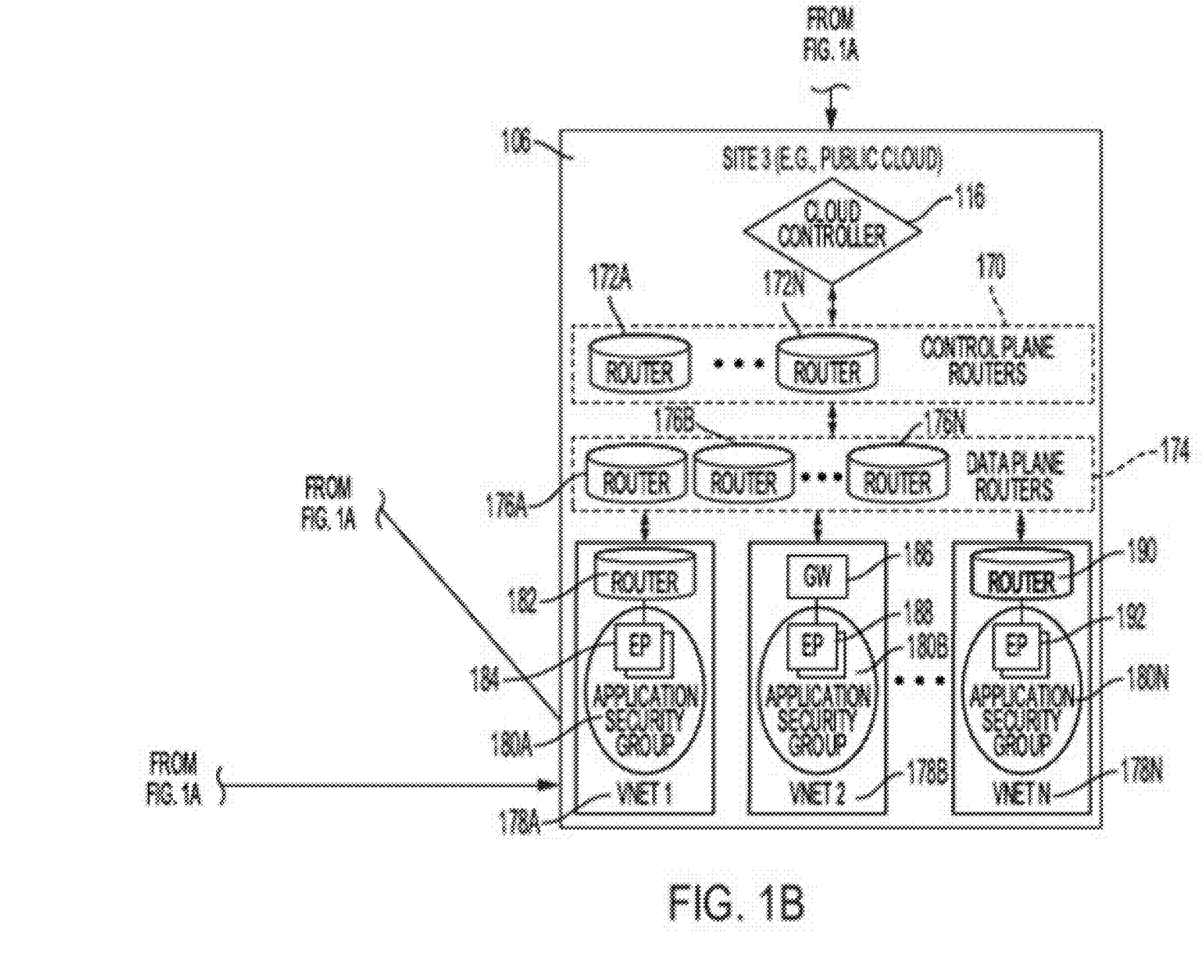
Figure 2:
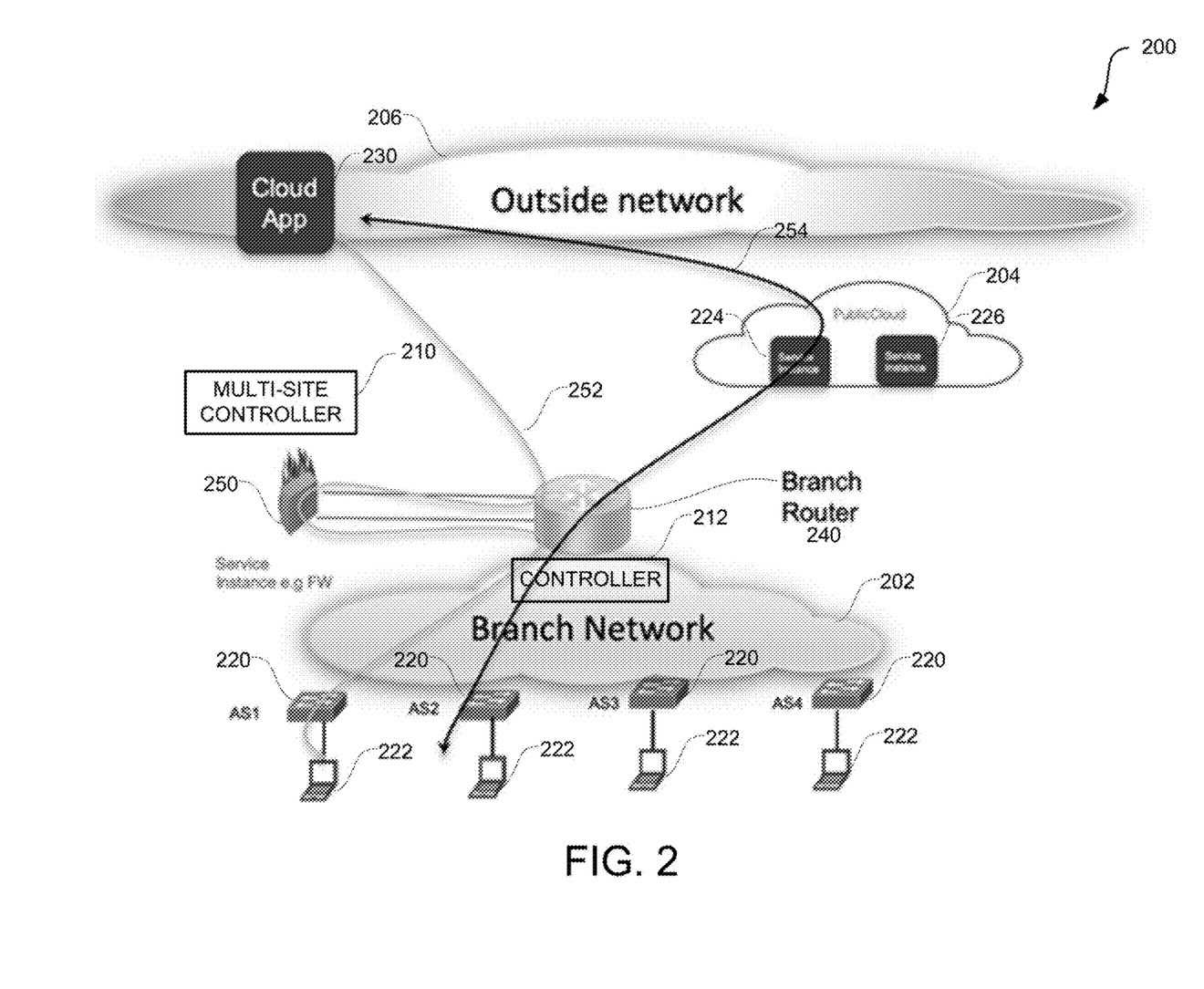
FIG. 2 illustrates a hybrid network environment configured for migration of traffic based on licenses associated with services, according to example aspects of this disclosure.
Figure 3:
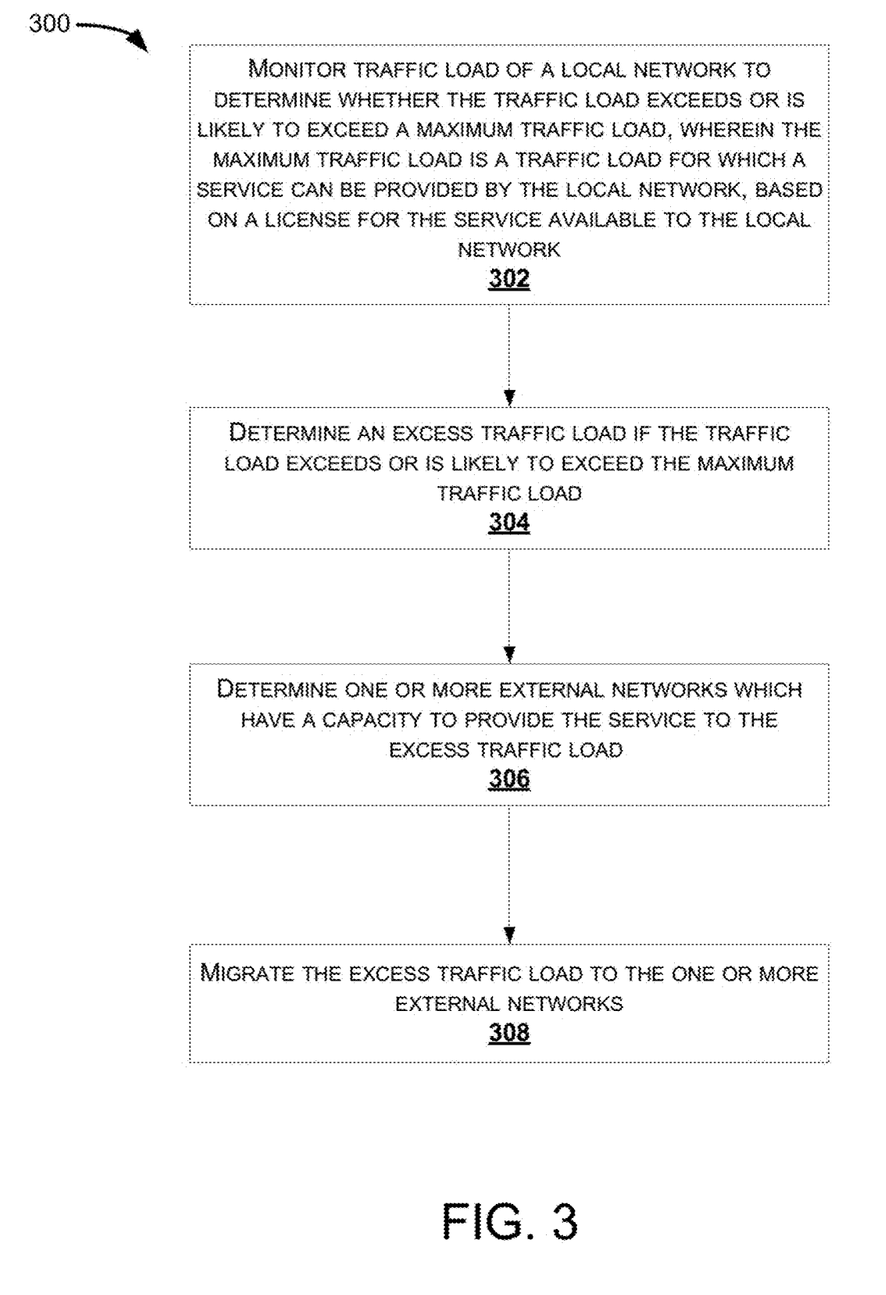
FIG. 3 illustrates an example process for migrating traffic based on licenses associated with services, according to example aspects of this disclosure.
Figure 4:
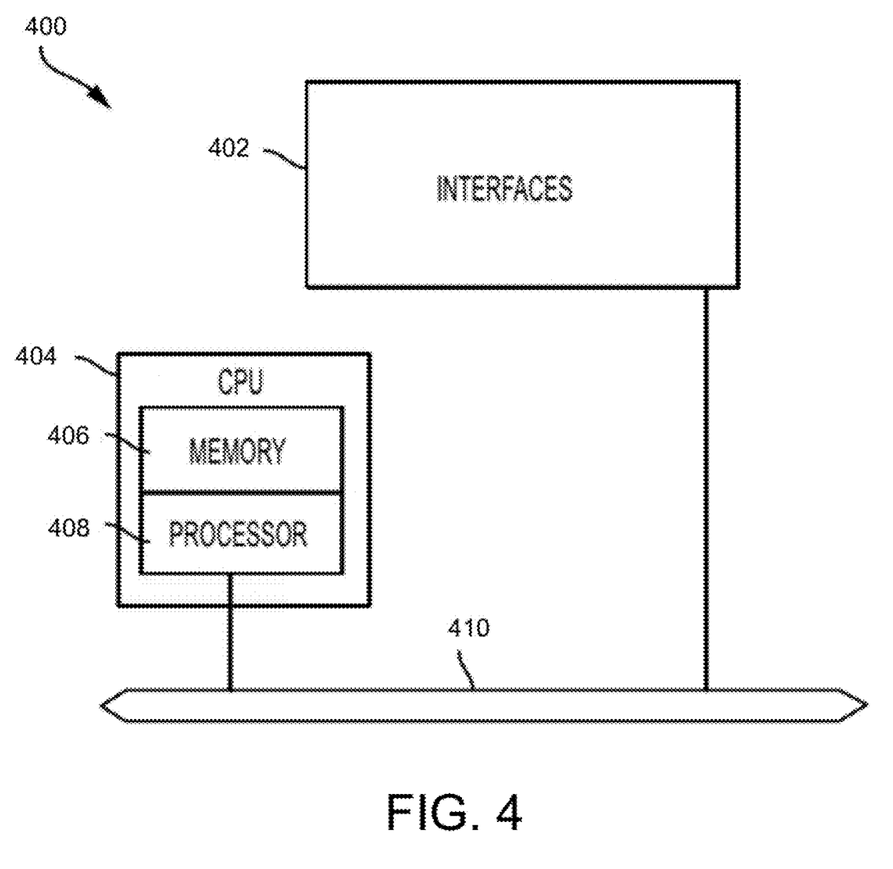
FIG. 4 illustrates an example network device in accordance with various examples.
Figure 5:
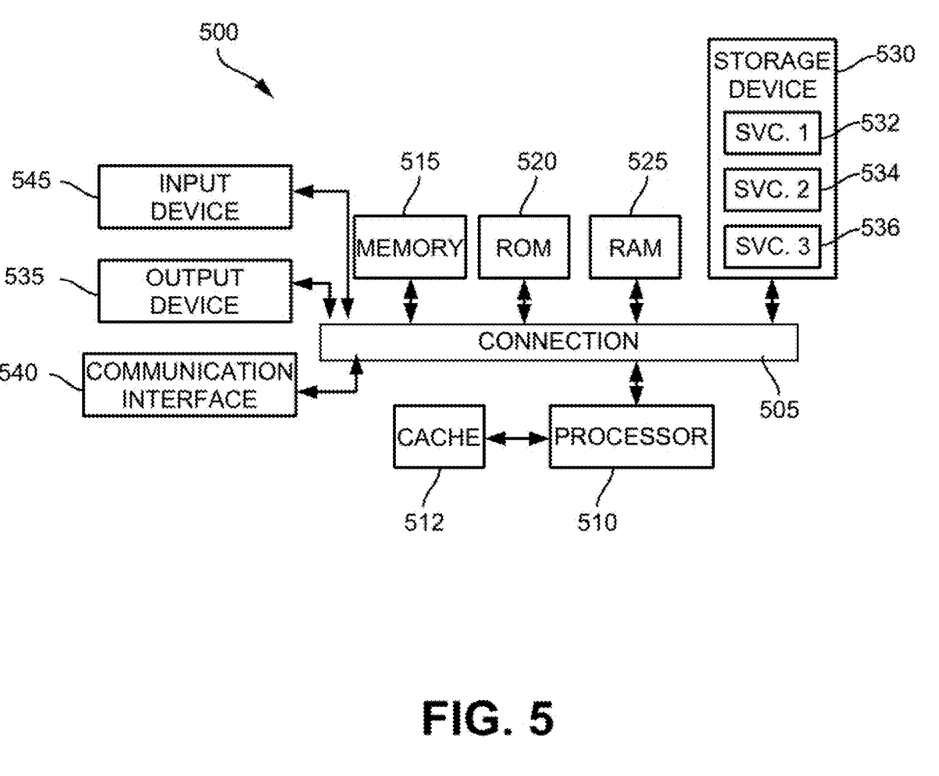
FIG. 5 illustrates an example computing device in accordance with various examples.

The present technologies will be described in more detail in the following disclosure as follows. The discussion begins with an overview of a hybrid network with a local network and one or more external networks, e.g., a multi-cloud fabric. The discussion continues with a description of an example architecture for routing traffic based on licenses, in a multi-cloud fabric, as illustrated in FIGS. 1A and 1B. A description of example strategies and traffic migration in a hybrid network, as illustrated in FIGS. 2-3, will then follow. The discussion concludes with a description of an example network device, as illustrated in FIG. 4, and an example computing device architecture, as illustrated in FIG. 5, including example hardware components suitable for performing networking and computing operations. The disclosure now turns to a discussion of routing and policy normalization and scaling in a multi-cloud fabric.

A multi-cloud fabric or datacenter solution, such as Cisco's Application-Centric Infrastructure (ACI), can manage network, security, and services for workloads in multiple network fabrics or datacenters, such as an on-premises datacenter and one or more cloud sites. In aspects of this disclosure, a service may be any logical construct configured to serve a function in the networking environment. In some cases more than one service may operate on a single physical machine in the networking environment. The service may be in the form of, for example, an application or portion of an application hosted on one or more endpoints managed by a network administrator, an endpoint group, etc., configured to serve a function. In some examples, network traffic migration can include migration of endpoint groups. For example, the multi-cloud solution can group endpoints into groups or collections of endpoints called endpoint groups (EPGs), and apply security policies, licenses, or contracts to corresponding EPGs. With the multi-cloud solution, an EPG can include endpoints in both the on-premises datacenter and the public cloud(s). The EPGs allow the service licenses (e.g., for a content delivery network (CDN), firewalls, intrusion prevention system (IPS), video-optimization etc.) to be implemented on traffic based on endpoints on both the on-premises datacenter and the public cloud(s). The security policies and networking configurations for providing these services can be managed by one or more controllers associated with the multi-cloud solution, such as an ACI Application Policy Infrastructure Controller (APIC) and/or a multi-site APIC.

In some examples, networking configurations and policies in public clouds can have various models or schemes, and different restrictions imposed by the cloud providers. In some cases, a cloud provider may impose restrictions which limit the services provided to the on-premises data center based on contracted licenses.

FIGS. 1A and 1B illustrate an example architecture for seamless interconnect functionality in a multi-cloud fabric 100. The multi-cloud fabric 100 can include an on-premises site 102 (e.g., Site 1), such as a private cloud or datacenter, and public clouds 104 and 106 (e.g., Site 2 and Site 3). In this example, the on-premises site 102 may implement a specific software-defined network (SDN) or datacenter solution, such as Cisco's ACI, while the public clouds 104 and 106 may implement different cloud solutions, such as Amazon's AWS and Microsoft's Azure.

The on-premises site 102 can be configured according to the specific SDN or datacenter solution implemented by the on-premises site 102, such as Cisco's ACI, which can be implemented and/or managed via one or more controllers, such as controller 112 (e.g., APIC). The controller 112 can manage security policies, licenses, and interconnectivity for elements in the on-premises site 102, such as switches (e.g., leaf switches, spine switches, etc.), routers (e.g., physical or virtual gateways or routers, etc.), endpoints (e.g., VMs, software containers, virtual appliances, servers, applications, service chains, workloads, etc.), and/or any other element (physical and/or virtual/logical) in the on-premises site 102. For example, the on-premises site 102 can include spine switches 120 and leaf switches 122 configured to provide network connectivity to VMs 124, 126, and 128 in the on-premises site 102. In this example, the controller 112 can manage security policies and interconnectivity for traffic processed by the spine switches 120, the leaf switches 122, and the VMs 124, 126, and 128.

The controller 112 can configure EPGs 130, 132, and 134 (EPG 1, EPG 2, EPG N), which can be used to manage and implement policies and configurations and migrate traffic for groups of endpoints (e.g., VMs 124, 126, 128). EPGs (e.g., 130, 132, 134) are managed objects that contain endpoints (e.g., VMs, software containers, virtual appliances, servers, applications, service chains, workloads, etc.) that are connected to the network (e.g., on-premises site 102) either directly or indirectly. Each EPG (130, 132, 134) can include a group of endpoints. For example, EPG 130 can include VMs 124, EPG 132 can include VMs 126, and EPG 134 can include VMs 128.

The endpoints (e.g., VMs 124, 126, 128) in the EPGs 130, 132, 134 can have certain attributes, such as an address, location, identity, prefix, functionality, application service, etc., and can be physical and/or virtual. EPGs are thus logical grouping of such endpoints based on one or more common factors. Non-limiting example factors which can be used to group endpoints into a common EPG include common security requirements, common VM mobility requirements, common QoS (quality-of-service) settings, common L4-L7 (Layer 4 through Layer 7) services, etc. EPGs (e.g., 130, 132, 134) can span multiple switches and can be associated with respective bridge domains (BDs). In some aspects, endpoint membership in an EPG can be static or dynamic.

The EPGs 130, 132, 134 can contain respective endpoint memberships and can represent different EPGs (e.g., logical groupings) that are based on different, respective factors as previously explained. For example, EPG 130 may represent a logical grouping of endpoints (e.g., VMs 124) configured as web servers (e.g., WEB-EPG), EPG 132 may represent a logical grouping of endpoints (e.g., VMs 126) configured as database servers (e.g., DB-EPG), and EPG 134 may represent a logical grouping of endpoints (e.g., VMs 128) configured as specific application servers (e.g., APP.A-EPG). The controller 112 can configure specific licenses and policies (e.g., contracts, filters, requirements, etc.) for each of the EPGs 130, 132, 134. Such policies or licenses can define, for example, what EPGs can communicate with each other and what type of traffic can pass between the EPGs 130, 132, 134.

The controller 112 can also configure virtual routing and forwarding (VRF) instances (136A, 136B, 136N) which provide different address domains that serve as private networks and segregate traffic between the VRFs. The VRFs 136A-N can include various, respective objects such as endpoints (e.g., VMs 124, 126, 128) EPGs (e.g., 130, 132, 134), etc. For example, VMs 124 and EPG 130 can reside in VRF 136A, VMs 126 and EPG 132 can reside in VRF 136B, and VMs 128 and EPG 134 can reside in VRF 136N.

The multi-cloud fabric 100 can also include a multi-site controller 110 (e.g., multi-site APIC) which communicates with controller 112 in the on-premises site 102 and cloud controllers 114 and 116 (e.g., cloud APICs) respectively on the public cloud 104 and the public cloud 106, and works with controller 112 and cloud controllers 114 and 116 to manage and implement policies and configurations on both the on-premises site 102 and the public clouds 104 and 106. The multi-site controller 110 can implement a same policy model on the on-premises site 102 and the public clouds 104 and 106, which can be based on a particular SDN or datacenter solution such as Cisco's ACI. For example, the multi-site controller 110 can implement VRFs, EPGs and associated policies on the on-premises site 102 as well as the public clouds 104 and 106. Such policies can be coordinated by the multi-site controller 110 with the controller 112 in the on-premises site 102 and the cloud controllers 114 and 116 in the public clouds 104 and 106, respectively.

The public clouds 104 and 106 can also implement different policy models and may have their own sets of requirements (e.g., policy requirements, scalability requirements, etc.) which may differ from those imposed by the solution implemented by the multi-site controller 110, the controller 112, and the cloud controllers 114 and 116. The policy models and requirements on the public clouds 104 and 106 can depend on the respective cloud providers.

The public cloud 104 can include virtual private clouds (VPCs) 154A, 154B, and 154N, which represent private networks on the public cloud 104 and which can be interconnected with the on-premises site 102 and the public cloud 106 as described herein. The VPCs 154A, 154B, and 154N can host applications and resources on the public cloud 104 for use by the on-premises site 102. In some cases, the VPCs 154A, 154B, and 154N can represent or map to VRFs (e.g., 136A, 136B, 136N) on the on-premises site 102.

The VPCs 154A, 154B, and 154N can include endpoints (EPs) 158, 164, and 168 on the public cloud 104. For example, VPC 154A can include EPs 158, VPC 154B can include EPs 164, and VPC 154N can include EPs 168. The EPs 158, 164, 168 can include virtual/logical and/or physical endpoints, such as VMs, software containers, physical servers, etc. The EPs 158, 164, 168 can be included in security groups 160A, 160B, 160N, which are policy constructs implemented by the public cloud 104, and which can be translated to EPGs as described herein. The security groups 160A, 160B, 160N can include one or more respective security policies defined for traffic matching one or more attributes associated with the security groups 160A, 160B, 160N, such as IP addresses (e.g., the IP addresses of EPs 158, 164, 168 in the security groups 160A, 160B, 160N), labels (e.g., VM labels or tags), EP attributes (e.g., VM names or characteristics), IP prefixes, etc.

Traffic to and from the VPCs 154A, 154B, and 154N can be routed via routers 156, 162, and 166, which can include virtual cloud routers, virtual private gateways or VPN gateways (hereinafter "vGWs"), cloud services routers (CSR) such as Cisco CSR1kV routers, and the like. The routers 156, 162, 166 can serve as the ingress and egress points of the VPCs 154A, 154B, 154N, and can interconnect the VPCs 154A, 154B, 154N with each other as well as other external devices or networks (e.g., on-premises site 102 and public cloud 106) through a cluster 150 of data plane routers 152A, 152B, 152N. The data plane routers 152A, 152B, 152N can include virtual cloud routers, virtual gateways, CSR routers such as Cisco CSR1kV routers, and the like.

The routers 156, 162, and 166 can provide interconnectivity between the public cloud 104 and the on-premises site 102 and the public cloud 106 through a cluster 138 of control plane routers 140A and 140N. The control plane routers 140A and 140N can manage the importing and exporting of routes into the on-premises site 102, the public cloud 106, the MSC 110, etc., in order to support interconnectivity between the public cloud 104, the on-premises site 102, and the public cloud 106. In some implementations, the control plane routers 140A and 140N can import and export routes using EVPN (Ethernet Virtual Private Network) BGP (border gateway protocol). The control plane routers 140A and 140N can establish BGP sessions with the on-premises site 102, the public cloud 106, and/or the MSC 110 to exchange routes.

The control plane routers 140A and 140N can include BGP speakers or agents for establishing BGP sessions. In some implementations, the control plane routers 140A and 140N support or implement two control plane sessions (e.g., BGP sessions) with every other site (e.g., on-premises site 102 and public cloud 106) for redundancy and intersite connectivity. In other implementations, the control plane routers 140A and 140N may support or implement more or less control plane sessions for every other site. For example, the control plane routers 140A and 140N may support or implement a single control plane session for one or more other site (e.g., on-premises site 102 and/or public cloud 106) or more than two control plane session for one or more other site (e.g., on-premises site 102 and/or public cloud 106).

The control plane routers 140A and 140N can include CSR routers, such as Cisco CSR1kV routers, and can be equipped with sufficient capacity to store and manage all the routes for the public cloud 104. Moreover, the control plane routers 140A and 140N can support or implement internal control plane sessions (e.g., BGP sessions) with a cluster 150 of data plane routers 152A, 152B, 152N and/or routers 156, 162, 166 on the VPCs 154A, 154B, 154N, to exchange and manage routing information for the public cloud 104. In some cases, the control plane routers 140A and/or 140N can also double up as data plane routers. For example, the control plane routers 140A and/or 140N can double up as data plane routers in addition to, or in lieu of, other data plane routers (e.g., 152A, 152B, 152N).

In some cases, as further described below, the data plane routers 152A, 152B, 152N can be mapped or designated to a specific subset of VPCs 154A, 154B, 154N in order to distribute data plane routing functionalities and responsibilities for traffic to and from the VPCs 154A, 154B, 154N amongst the data plane routers 152A, 152B, 152N. Here, the control plane routers 140A and 140N can manage the distribution of internal routes to map the data plane routers 152A, 154B, 152N to respective VPCs 154A, 154B, 154N and/or distribute the routing functionalities and responsibilities accordingly.

Moreover, the cloud controller 114 in the public cloud 104 can communicate with MSC 110, controller 112 in the on-premises site, and cloud controller 116 on the public cloud 106 to coordinate and manage the exchange and/or translation of policies between the on-premises site 102, the public cloud 104, and the public cloud 106, as well as the implementation of such policies in the public cloud 104. For example, the cloud controller 114 can communicate with MSC 110 to map or translate EPGs 130, 132, 134 (and associated policies) in the on-premises site 102 to the security groups 160A, 160B, 160N in the public cloud 104, map or translate the VRFs 136A, 136B, 136N in the on-premises site 102 to the VPCs 154A, 154B, 154N in the public cloud 104, and/or map or translate any other policy constructs or objects in the on-premises site 102 to the public cloud 104.

As previously mentioned, the multi-cloud fabric 100 can include one or more additional public clouds, such as public cloud 106, which can implement a different policy model, environment, and/or cloud or datacenter solution as public cloud 104 and/or on-premises site 102 and which may have different requirements or limitations than public cloud 104 and/or on-premises site 102. For example, in some aspects, the on-premises site 102 may implement Cisco's ACI solution, while the public cloud 104 implements a different cloud solution, such as Amazon's AWS, and the public cloud 106 implements yet a different cloud solution, such as Microsoft's Azure or Oracle Cloud.

In the illustrative example in FIGS. 1A and 1B, the public cloud 106 can include virtual networks (VNETs) 178A, 178B, and 178N, which represent private networks on the public cloud 106 and which can be interconnected with the on-premises site 102 and the public cloud 104 as described herein. Like the VRFs 136A, 136B, and 136N and the VPCs 154A, 154B, and 154N, the VNETs 178A, 178B, and 178N can function as private virtual networks with specific address spaces, with each virtual network being isolated from other virtual networks and with each virtual network hosting respective applications, resources, devices, etc., and having specific security and routing policies. For example, the VNETs 178A, 178B, and 178N can host applications and resources on the public cloud 106 for use by the on-premises site 102 and/or the public cloud 104. In some cases, the VNETs 178A, 178B, and 178N can represent or map to VRFs (e.g., 136A, 136B, 136N) on the on-premises site 102.

The VNETs 178A, 178B, and 178N can include endpoints (EPs) 184, 188, and 192 on the public cloud 106. For example, VNET 178A can include EPs 184, VNET 178B can include EPs 188, and VNET 178N can include EPs 192. The EPs 184, 188, 192 can include virtual/logical and/or physical endpoints, such as VMs, software containers, physical servers, etc. The EPs 184, 188, 192 can be included in application security groups 180A, 180B, 180N, which are policy constructs implemented by the public cloud 106, and which can be translated to EPGs as described herein. The application security groups 180A, 180B, 180N can include one or more respective security policies defined for traffic matching one or more attributes associated with the application security groups 180A, 180B, 180N, such as IP addresses (e.g., the IP addresses of EPs 184, 188, 192 in the application security groups 180A, 180B, 180N), labels (e.g., VM labels or tags), EP attributes (e.g., VM names or characteristics), IP prefixes, etc.

Traffic to and from the VNETs 178A, 178B, and 178N can be routed via routers 182, 186, and 190, which can include virtual cloud routers, virtual private gateways or VPN gateways, CSR routers such as Cisco CSR1kV routers, and the like. The routers 182, 186, 190 can serve as the ingress and egress points of the VNETs 178A, 178B, and 178N, and can interconnect the VNETs 178A, 178B, and 178N with each other as well as other external devices or networks (e.g., on-premises site 102 and public cloud 104) through a cluster 174 of data plane routers 176A, 176B, 176N. The data plane routers 176A, 176B, 176N can include virtual cloud routers, virtual gateways, CSR routers such as Cisco CSR1kV routers, and the like.

The routers 182, 186, and 190 can provide interconnectivity between the public cloud 106, the on-premises site 102 and the public cloud 104 through a cluster 170 of control plane routers 172A and 172N. The control plane routers 172A and 172N can manage the importing and exporting of routes into the on-premises site 102, the public cloud 104, the MSC 110, etc., in order to support interconnectivity between the public cloud 106, the on-premises site 102, and the public cloud 104. In some implementations, the control plane routers 172A and 172N can import and export routes using EVPN BGP. The control plane routers 172A and 172N can establish BGP sessions with the on-premises site 102, the public cloud 104, and/or the MSC 110 to exchange routes.

The control plane routers 172A and 172N can include BGP speakers or agents for establishing BGP sessions. In some implementations, the control plane routers 172A and 172N support or implement two control plane sessions (e.g., BGP sessions) with every other site (e.g., on-premises site 102 and public cloud 104) for redundancy and intersite connectivity. In other implementations, the control plane routers 172A and 172N may support or implement more or less control plane sessions for every other site. For example, the control plane routers 172A and 172N may support or implement a single control plane session for one or more other site (e.g., on-premises site 102 and/or public cloud 104) or more than two control plane session for one or more other site (e.g., on-premises site 102 and/or public cloud 104).

The control plane routers 172A and 172N can include CSR routers, such as Cisco CSR1kV routers, and can be equipped with sufficient capacity to store and manage all the routes for the public cloud 106. Moreover, the control plane routers 172A and 172N can support or implement internal control plane sessions (e.g., BGP sessions) with a cluster 174 of data plane routers 176A, 176B, 176N and/or routers 182, 186, 190 on the VNETs 178A, 178B, and 178N, to exchange and manage routing information for the public cloud 106. In some cases, the control plane routers 172A and/or 172N can also double up as data plane routers. For example, the control plane routers 172A and/or 172N can double up as data plane routers in addition to, or in lieu of, other data plane routers (e.g., 176A, 176B, 176N).

In some cases, as further described below, the data plane routers 176A, 176B, 176N can be mapped or designated to a specific subset of VNETs 178A, 178B, and 178N in order to distribute data plane routing functionalities and responsibilities for traffic to and from the VNETs 178A, 178B, and 178N amongst the data plane routers 176A, 176B, 176N. Here, the control plane routers 172A and 172N can manage the distribution of internal routes to map the data plane routers 176A, 176B, 176N to respective VNETs 178A, 178B, and 178N and/or distribute the routing functionalities and responsibilities accordingly.

Moreover, the cloud controller 116 in the public cloud 106 can communicate with MSC 110, controller 112 in the on-premises site, and cloud controller 114 on the public cloud 104 to coordinate and manage the exchange and/or translation of policies between the on-premises site 102, the public cloud 104, and the public cloud 106, as well as the implementation of such policies in the public cloud 106. For example, the cloud controller 116 can communicate with MSC 110 to map or translate EPGs 130, 132, 134 (and associated policies) in the on-premises site 102 to the application security groups 180A, 180B, 180N in the public cloud 106, map or translate the VRFs 136A, 136B, 136N in the on-premises site 102 to the VNETs 178A, 178B, and 178N in the public cloud 106, and/or map or translate any other policy constructs or objects in the on-premises site 102 to the public cloud 106.

The public cloud 104 and the public cloud 106 can implement a network overlay for data plane routing, such as VxLAN (Virtual Extensible LAN), and a control plane solution such as BGP or EVPN BGP for control plane functionality. For example, as previously described, the public cloud 104 and the public cloud 106 can implement various layers of BGP sessions for control plane functionality. Use of BGP or BGP EVPN with an overlay data plane solution such as VxLAN for inter-site sessions (e.g., sessions between the on-premises site 102, the public cloud 104, and/or the public cloud 106) can help provide a seamless extension of VRFs (e.g., 136A, 136B, 136N) or other routing domain or addressing constructs/schemes between sites (e.g., 102, 104, 106) using one or more BGP Sessions and carry data packets in a network (e.g., an IP network) without additional segment-specific configurations. The MSC 110 can map the local virtual or private network (e.g., VRFs, VPCs, VNETs) segment identifiers (IDs) between the on-premises site 102 and the public clouds 104, 106 and/or between the public clouds 104, 106, and can manage the route import and export into the corresponding virtual or private networks (e.g., VRFs, VPCs, VNETs) through mapping of BGP or BGP EVPN route targets. This strategy can establish a common routing and forwarding plane the on-premises site 102 and the public clouds 104, 106.

FIG. 2 illustrates a hybrid network 200 configured according to example aspects of this disclosure. The hybrid network 200 can include aspects of a network fabric and architecture that are similar to the multi-cloud fabric 100 discussed with reference to FIGS. 1A-B. The hybrid network 200 can include a local network shown as branch network 202 (e.g., an on-premises site, a customer network, a private cloud, a datacenter, or the like), and one or more external networks shown as a public cloud 204 and an outside network 206. In some examples, the branch network 202 can include an on-premises cloud network such as Cisco's ACI. In some examples, one or more of the public cloud 204 and the outside network 206 can include Amazon's AWS and Microsoft's Azure.

The branch network 202 can include one or more elements such as switches, routers, endpoints, etc. For example, routers 220 and endpoints 222 are shown, where the routers 220 can include physical or virtual gateways or routers and the endpoints 222 can include user equipment, virtual machines, software containers, virtual appliances, servers, applications, service chains, workloads, etc. In some examples, one or more endpoints 222 can be configured as an endpoint group (EPG). A network device such as a controller 212 can be provided in the branch network 202 for managing security policies, licenses, interconnectivity among the elements such as the routers 220, the endpoints 222, etc. A branch router 240 can be configured to manage the flow of traffic into and out of the branch network 202.

In some examples, the branch network 202 can have one or more associated licenses for providing one or more services. For example, a service with a license associated with it can be provided for traffic load in the branch network 202 by executing service applications or using instantiated service instances. In some examples, a license for a service can be based on a pre-negotiated or contracted traffic load in terms of throughput, number of connections, flow, processing and memory requirements, etc., for the traffic load supported by the branch network 202.

In some examples, a number of service instances or types of services instances which can be executed or supported by the branch network 202 to provide the service can be based on the associated license. For instance, based on the number of applications being executed, the traffic flow (e.g., data and/or control flow), processing or memory resource utilization at the endpoints 222, etc., the number of service instances to provide the service can vary. As previously mentioned, the service can include firewalls, CDN, intrusion prevention system (IPS), video-optimization etc., for the traffic in the branch network 202. If the traffic load increases, the existing service instances in the branch network 202 may be unable to provide the service for all traffic in the branch network 202. For example, during peak traffic times in an organization, a service such as firewalls for the traffic can come under strain and be unable to keep up an expected quality of the service. While an increase in the license, leading to a corresponding increase in the capacity of the branch network 202 to provide the service can meet the demands of the peak traffic, such an increase in demand on the fly may not be feasible. The branch network 202 may not have the capacity to instantiate additional service instances on the fly to increase the capacity of the service to match the increased traffic load. While these challenges can lead to poor user experience, denial of access, loss of quality in the services, etc., aspects of this disclosure overcome such challenges and continue to provide the service to the excess traffic in a seamless manner by migrating the excess traffic to one or more external networks which can provide the desired service to the excess traffic.

In some examples, the excess traffic can be migrated to an external network such as the public cloud 204 and/or the outside network 206. A multi-site controller 210 (similar to the MSC 110 discussed previously) can be configured to handle such migration. In some examples, migrating or offloading traffic from the branch network 202 to the external network can lead to providing the desired service to the offloaded traffic by the external network, thus mitigating the stress on the branch network 202 for providing the service. The external network to which the traffic is migrated can have sufficient licenses to support the desired service for the offloaded traffic. In some examples, one or more additional service instances may be instantiated in the external networks to provide the service to the excess traffic.

In FIG. 2, a service instance 250 is shown, which can be instantiated to provide a service. The service can include third-party services or in-house natively managed services. In some examples, the service instance 250 can be configured to provide a service such as the firewall to a certain traffic load on the branch network 202. In some examples, the service instance 250 may be among one or more service instances of the branch network 202 which have been provisioned or instantiated to provide the service. The number of available service instances in the branch network may be based on the license. The number of available service instances may have a combined maximum capacity for providing the service, where the maximum capacity can be associated with a maximum traffic load. For example, based on the license available to the branch network 202 for providing the service, the branch network 202 may at most be able to provide the service to a maximum traffic load.

In typical scenarios, organizations or customers (e.g., related to the branch network 202) may obtained license based on typical case traffic loads (but not worst case estimate) to be cost effective. Thus, the maximum capacity for providing the service may be sufficient in typical scenarios which may not involve the maximum traffic load in the branch network 202. However, there may be seasonal or occasional increases in the traffic load past the maximum traffic load in the branch network 202 (e.g., for an enterprise network such as a department store during holiday shopping season). In these situations, the traffic load may exceed or may be likely to exceed the maximum traffic load by an amount referred to as the excess traffic load.

Various techniques can be implemented for monitoring the traffic load to detect whether the traffic load exceeds or is likely to exceed the maximum traffic load. For example, the branch router 240 can monitor the traffic flowing through the branch network 202. In some examples, the controller 212 can identify trends in the traffic flow, in conjunction with other learning and predictive techniques to predict upcoming spikes in the traffic flow. In various examples when the traffic flow exceeds (e.g., based on the monitoring) or is likely to exceed (e.g., based on the prediction) the maximum traffic load, then the excess traffic load can be determined, where the branch network 202 may not be able to provide service to the excess traffic load. In such scenarios, a network device such as the controller 212 can provide a signal to the multi-site controller 210 that the excess traffic load from the branch network 202 will be offloaded. In some examples, offloading the excess traffic load can include migrating one or more applications, VMs, EPGs, etc. The multi-site controller 210 can determine an additional service which would be desirable to support the excess traffic load. For example, the additional service can be provided by one or more additional service instances which may be unavailable at the branch network 202 but may be available or can be provisioned in one or more of the external networks.

In some examples, the controller 212 and/or the multi-site controller 210 can identify the additional service (e.g., the firewall) to be provided to the excess traffic load based on the license. The multi-site controller 210 can determine one or more external networks to which the excess traffic load can be migrated to based on knowledge of the capacity of the one or more external networks to host the one or more additional service instances.

For example, the multi-site controller 210 can be aware of the service capabilities available at the various external networks for providing the service. For example, the public cloud 204 can host or support two service instances 224 and 226 which may be capable of providing the service. Similarly, the outside network 206 can have a cloud application 230 which may be capable of providing the service. The multi-site controller 210 can determine that one or more of the service instances 224 and 226 and the cloud application 230 can be utilized to instantiate the additional service instances for providing the service to the excess traffic load which is to be migrated from the branch network 202. The multi-site controller 210 can then migrate the offloaded excess traffic to the public cloud 204 and/or the outside network 206, through a route 252 or the route 254, where the service instances 224, 226 and/or the cloud application 230 can provide the additional service. In some cases, a service instance such as the service instance 224 in the public cloud 204 which can provide the service can be migrated to the cloud application 230 in the outside network 206 to provide the service. Routing the offloaded excess traffic in this manner can include any one or more of the above-described processes, e.g., for migrating VMs, EPGs, etc.

In some examples, the service instances 224 and 226 and/or the cloud application 230 in the external networks may be pre-existing or may be created specifically to provide the additional service to the migrated excess traffic load. The respective external networks can include licenses to enable the service instances 224 and 226 and the cloud application 230 to provide the desired service. These licenses can be generated ad-hoc or pre-negotiated by the branch network 202 for providing the additional service to such occasional excess traffic loads. In some examples, the branch network 202 can have an ongoing or standing subscription for the additional licenses to be utilized by the external networks to provide the additional service when needed. In some examples, the branch network 202 can be provided with an option to upgrade its license to an updated license based on the additional license, such that the updated license may have the capacity to support some or all of the offloaded excess traffic.

In some examples, some or all of the offloaded excess traffic load can be migrated back to the branch network 202 once the traffic in the branch network 202 subsides to a point where bringing back the excess traffic load (or portion thereof) would not exceed the maximum traffic load of the branch network 202. This determination of when and if to migrate back the offloaded excess traffic load (or portion thereof) from the one or more external networks to the branch network 202 can be based on the traffic load in the branch network 202.

Accordingly, in example aspects, traffic in the branch network 202 can be offloaded to one or more external networks such as the public cloud 204, the outside network 206, etc. The amount and nature of traffic offloaded can be based on a service provided by one or more service instances in the branch network 202. For example, a license associated with the service can determine the maximum traffic load for which the one or more service instances in the branch network 202 can provide the service. When the traffic load exceeds or is likely to exceed the maximum traffic load (e.g., as determined by the branch router 240) an excess traffic load which the one or more service instances will be unable to provide the service to can be determined, e.g., by the controller 212. The excess traffic load may be offloaded or migrated to the one or more external networks. The multi-site controller 210, for example, can identify one or more external networks such as the public cloud 204, the outside network 206, etc., which may have the capacity or capability to provide the service to the offloaded excess traffic (e.g., based on hosting or being able to initiate the service instances 224, 226, the cloud application 230, etc.). The multi-site controller 210 can then route the offloaded excess traffic to the one or more external network using the routes 252, 254, etc., which can ensure that the service remains available to the offloaded excess traffic.

In some cases, migrating the offloaded excess traffic in this manner can incur additional costs, which can be temporary or permanent. For example, the branch network 202 can obtain licenses for the service related to the offloaded excess traffic to be supported by the one or more external networks. In some cases, once the traffic subsides in the branch network 202, some or all of the offloaded excess traffic can be migrated back to the branch network 202 where the available one or more service instances in the branch network 202 can now support the service for the returned offloaded excess traffic (or portion thereof).

Having described example systems and concepts, the disclosure now turns to the process 300 illustrated in FIG. 3. The steps or blocks outlined herein are examples and can be implemented in any combination thereof, including combinations that exclude, add, or modify certain steps.

At block 302, the process 300 can include monitoring traffic load of a local network to determine whether the traffic load exceeds or is likely to exceed a maximum traffic load, wherein the maximum traffic load is a traffic load for which a service can be provided by the local network, based on a license for the service available to the local network. For example, the traffic load of the branch network 202 can be monitored by the branch router 240. The maximum traffic load can be determined for the branch network 202 based on a license available to the branch network 202 for providing a service, such as firewalls.

At block 304, the process 300 can include determining an excess traffic load if the traffic load exceeds or is likely to exceed the maximum traffic load. For example, based on the various monitoring and/or prediction capabilities, the branch router 240 and/or the controller 212 (or combinations thereof) can determine whether the traffic load exceeds or is likely to exceed the maximum traffic load in the branch network 202.

At block 304, the process 300 can include determining one or more external networks which have a capacity to provide the service to the excess traffic load. For example, the multi-site controller 210 can determine one or more of the public cloud 204 or the outside network 206 as being potential recipients of the migrated excess traffic based on these external networks having the capability or capacity to provide the service to the excess traffic load. For instance, the service to the excess traffic load can be provided by one or more additional service which are available or can be instantiated in the one or more external networks At block 304, the process 300 can include migrating the excess traffic load to the one or more external networks. For example, the multi-site controller 210 may migrate the excess traffic load to the public cloud 204 and/or the outside network 206. In some examples, an additional license may be with the one or more additional service instances for providing the service to the migrated excess traffic load. In some examples, an updated license may be determined for branch network 202 based on the additional license. In some examples, at least a portion of the excess traffic load can be migrated back to the branch network 202 from the one or more external networks when the traffic load falls below the maximum traffic load.

In the various examples the service can include one or more of a firewall, content delivery network (CDN), intrusion prevention system (IPS), video-optimization, among others, or combinations thereof. In the various examples, the traffic load can include one or more of a throughput, traffic flow, number of concurrent connections, processing resource utilization, or memory resource utilization.

FIG. 4 illustrates an example network device 400 suitable for implementing policy agents and performing switching, routing, and other networking operations. The network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. The CPU 404 may include one or more processors 408, such as a processor from the INTEL X86 family of microprocessors. In some cases, the processor 408 can be specially designed hardware for controlling the operations of the network device 400. In some cases, a memory 406 (e.g., non-volatile RAM, ROM, etc.) also forms part of the CPU 404. However, there are many different ways in which memory could be coupled to the system.

The interfaces 402 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 4 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 400 can also include an application-specific integrated circuit (ASIC) 412, which can be configured to perform routing and/or switching operations. The ASIC 412 can communicate with other components in the network device 400 via the connection 410, to exchange data and signals and coordinate various types of operations by the network device 400, such as routing, switching, and/or data storage operations, for example.

FIG. 5 illustrates a computing system architecture 500 wherein the components of the system are in electrical communication with each other using a connection 505, such as a bus. The example system 500 includes a processing unit (CPU or processor) 510 and a system connection 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware or software service, such as service 1 532, service 2 534, and service 3 536 stored in storage device 530, configured to control the processor 510 as well as a special-purpose processor where software instructions are incorporated into the actual processor design. The processor 510 may be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include services 532, 534, 536 for controlling the processor 510. Other hardware or software modules are contemplated. The storage device 530 can be connected to the system connection 505. In one aspect, a hardware module that performs a particular function can include the software component stored in a computer-readable medium in connection with the necessary hardware components, such as the processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:
1. A method comprising:
monitoring, by a multi-site controller, traffic load of a local network to determine whether the traffic load exceeds or is likely to exceed a maximum traffic load, wherein the maximum traffic load is a traffic load for which a service can be provided by the local network, based on a license for the service available to the local network, the license being an agreement between the local network and the multi-site controller, the license including the maximum traffic load of the local network and a type of service associated with the maximum traffic load between the local network by the multi-site controller, the type of service including firewall capabilities;

determining, by the multi-site controller, an excess traffic load if the traffic load associated with the firewall capabilities exceeds or is likely to exceed the maximum traffic load;

determining, by the multi-site controller, one or more external networks which have a capacity to provide the service of firewall capabilities to the excess traffic load, the multi-site controller including a list of the one or more external networks that are designated to receive the excess traffic load of the local network; and migrating, by the multi-site controller, the excess traffic load to the one or more external networks.

2. The method of claim 1, wherein the local network includes one or more service instances for providing the service for up to the maximum traffic load, and wherein the service to the excess traffic load is provided by one or more additional service instances.

3. The method of claim 2, wherein the one or more additional service instances are available or instantiated in the one or more external networks.

4. The method of claim 3, further comprising associating an additional license with the one or more additional service instances.

5. The method of claim 4, further comprising determining an updated license for the local network based on the additional license.

6. The method of claim 1, further comprising migrating at least a portion of the excess traffic load back to the local network from the one or more external networks when the traffic load falls below the maximum traffic load.

7. The method of claim 1, wherein the service further comprises one or more of a content delivery network (CDN), intrusion prevention system (IPS), or video-optimization.

8. The method of claim 1, wherein the traffic load comprises one or more of a throughput, traffic flow, number of concurrent connections, processing resource utilization, or memory resource utilization.

9. The method of claim 1, wherein the one or more external networks comprise one or more cloud networks.

10. A system, comprising:
one or more processors; and
a non-transitory computer-readable storage medium containing instructions which, when executed on the one or more processors, cause the one or more processors to perform operations including:
monitoring, by a multi-site controller, traffic load of a local network to determine whether the traffic load exceeds or is likely to exceed a maximum traffic load, wherein the maximum traffic load is a traffic load for which a service can be provided by the local network, based on a license for the service available to the local network, the license being an agreement between the local network and the multi-site controller, the license including the maximum traffic load of the local network and a type of service associated with the maximum traffic load between the local network by the multi-site controller, the type of service including firewall capabilities;

determining, by the multi-site controller, an excess traffic load if the traffic load associated with the firewall capabilities exceeds or is likely to exceed the maximum traffic load;

determining, by the multi-site controller, one or more external networks which have a capacity to provide the service of firewall capabilities to the excess traffic load, the multi-site controller including a list of the one or more external networks that are designated to receive the excess traffic load of the local network; and migrating, by the multi-site controller, the excess traffic load to the one or more external networks.

11. The system of claim 10, wherein the local network includes one or more service instances for providing the service for up to the maximum traffic load, and wherein the service to the excess traffic load is provided by one or more additional service instances.

12. The system of claim 11, wherein the one or more additional service instances are available or instantiated in the one or more external networks.

13. The system of claim 12, wherein the operations further comprise associating an additional license with the one or more additional service instances.

14. The system of claim 13, wherein the operations further comprise determining an updated license for the local network based on the additional license.

15. The system of claim 10, wherein the operations further comprise migrating at least a portion of the excess traffic load back to the local network from the one or more external networks when the traffic load falls below the maximum traffic load.

16. The system of claim 10, wherein the service comprises one or more of a content delivery network (CDN), intrusion prevention system (IPS), or video-optimization.

17. The system of claim 10, wherein the traffic load comprises one or more of a throughput, traffic flow, number of concurrent connections, processing resource utilization, or memory resource utilization.

18. The system of claim 10, wherein the one or more external networks comprise one or more cloud networks.

19. A non-transitory machine-readable storage medium, including instructions configured to cause a data processing apparatus to perform operations including:
monitoring, by a multi-site controller, traffic load of a local network to determine whether the traffic load exceeds or is likely to exceed a maximum traffic load, wherein the maximum traffic load is a traffic load for which a service can be provided by the local network, based on a license for the service available to the local network, the license being an agreement between the local network and the multi-site controller, the license including the maximum traffic load of the local network and a type of service associated with the maximum traffic load between the local network by the multi-site controller, the type of service including firewall capabilities;

determining, by the multi-site controller, an excess traffic load if the traffic load associated with the firewall capabilities exceeds or is likely to exceed the maximum traffic load;

determining, by the multi-site controller, one or more external networks which have a capacity to provide the service of firewall capabilities to the excess traffic load, the multi-site controller including a list of the one or more external networks that are designated to receive the excess traffic load of the local network; and migrating, by the multi-site controller, the excess traffic load to the one or more external networks.

20. The non-transitory machine-readable storage medium of claim 19, wherein the local network includes one or more service instances for providing the service for up to the maximum traffic load, and wherein the service to the excess traffic load is provided by one or more additional service instances.

* * * * *